Sept. 14, 1948.  M. VITOUX  2,449,154
DEVICE FOR MENDING STOCKINGS
Filed Nov. 20, 1946

INVENTOR.
MARCEL VITOUX
BY Richards & Geier
ATTORNEYS

Patented Sept. 14, 1948

2,449,154

UNITED STATES PATENT OFFICE 2,449,154

DEVICE FOR MENDING STOCKINGS

Marcel Vitoux, New York, N. Y., assignor to American Vitos Company, Inc., New York, N. Y., a corporation of New York Application November 20, 1946, Serial No. 711,167

5 Claims. (Cl. 66—1.5)

This invention relates to devices used for mending stockings or other articles made of knitted fabrics. The invention refers more particularly, but not exclusively, to devices of this character where the mending needle is attached at one end directly to the piston and forms a stem therefor, the opposite end of the needle passing through an opening in a guiding bushing, the contour of said opening corresponding to the cross section of the needle.

One object of the invention is to provide a device of this character wherein the guiding bushing may be rotated into any desired relative position with respect to the grasping means or handle provided at the top of the device.

Another object of the invention is to provide means on the bushing for easily rotating same.

A further object of the invention is to provide a removable handle for the device, said handle forming a closure for the top of the cylinder in which the piston operates.

Another object is to produce a device of the character described in which the maximum simplicity of construction is secured.

Other objects and advantages will appear as the nature of the improvements is better understood, the invention consisting substantially in the novel arrangements and co-relation of parts herein fully described, and illustrated in the accompanying drawings, wherein similar reference characters are used to described corresponding parts throughout the several views, and then finally pointed out and specifically defined and indicated in the appended claims.

The disclosure made the basis of exemplifying the present inventive concept, suggests a practical embodiment thereof, but the invention is not to be restricted to the exact details of this disclosure, and the latter, therefore, is to be understood from an illustrative rather than a restrictive standpoint.

In carrying out one embodiment of the invention it was found desirable to provide a mending device, having a cylinder in which a piston having a needle attached thereto is oscillated to and fro, with an adjustable needle guiding bushing at one end of said cylinder and a handle at the other end of the cylinder, the said handle being preferably screw threaded maintained on the cylinder and forming a closure therefor.

The invention will be more readily understood from the following detailed description when taken in connection with the accompanying drawing in which—

Figure 1:
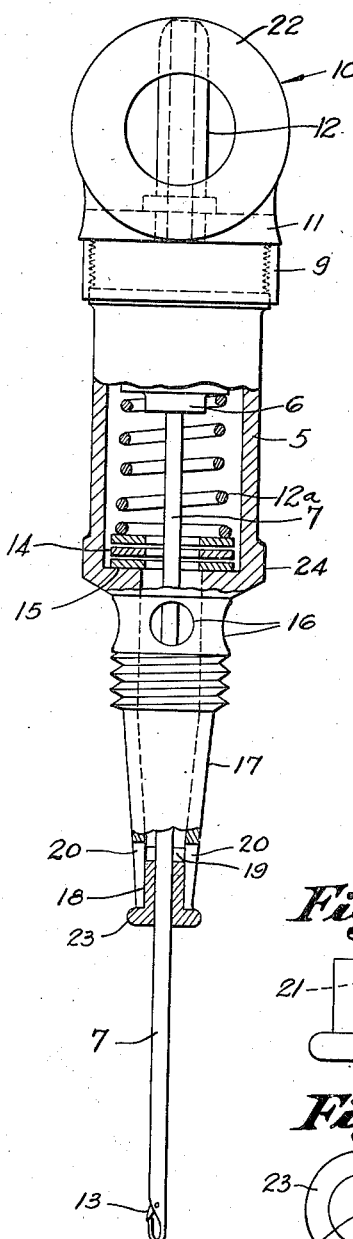
Figure 1 is a front elevational view partly broken away showing one embodiment of the invention.
Figure 2:
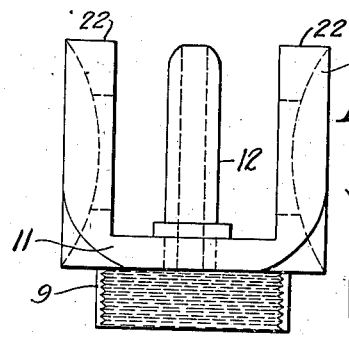
Figure 2 is a side elevational view thereof showing the handle disassembled from the cylinder.
Figure 3:
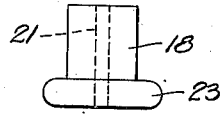
Figure 3 is a detail side elevation of the guiding bushing.
Figure 4:
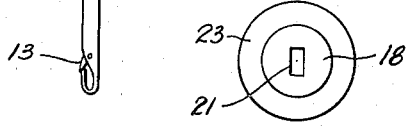
Figure 4 is a top plan view thereof.

Referring now to the drawings in detail, the numeral 5 indicates the cylinder or casing of the mending device. The said device includes the usual piston assembly 6 to which the knitting or mending needle 7 is secured and forms a stem for said piston assembly. The cylinder 5 is provided at the top thereof, with a screw threaded neck portion 8 for the reception of an internally threaded band or collar 9 of a finger grip or handle 10 having a lower wall 11 which forms a closure for the said cylinder 5. The wall 11 carries a nozzle 12 which opens into the neck 9 and consequently into the cylinder 5 and may be connected in the usual manner by a hose, not shown, to a source of compressed air, for operating the needle in one direction, a return spring 12a operating said needle in the opposite direction.

The needle 7 may be of any suitable type but is here shown as being of the type which is provided with a pivoted blade 13 at its knitting end. The tension of the spring 12a may be adjusted by the insertion of one or more washers 14 between the bottom of said spring and a seat 15 in the cylinder 5. Holes 16 in the lower portion 17 of the cylinder 5 permit the air to escape from the cylinder.

The needle 7 passes outwardly of the lower conical cylinder portion 17 through a guide of bushing 18 which is frictionally maintained in the bore 19 by virtue of a pair of oppositely disposed slots 20 in said conical portion 17. The said bushing is provided with a rectangular opening 21 which corresponds to the cross section of the needle 7 and acts as a guide for said needle in its to and fro motion. In order that the operator may be enabled to readily set the position of the needle with respect to the finger grips 22 of the handle 10, the bushing 18 is provided with a flange 23 by which the bushing 18 may be turned to carry the needle with it due to rectangular opening 21.

In order that the combined closure and handle 10 may be easily assembled or disassembled from the cylinder 5, the said cylinder is provided with a knurled area 24 which may be grasped in one hand while the finger grips 22 are held in the other hand when the handle is turned.

It is apparent that the specific embodiment shown above may be modified without departing from the scope and intent of the invention. All such modifications that fall within the scope of the appended claims are to be included in the present invention.

What is claimed is:

1. In a pneumatic mending device having a cylinder and a finger grip at one end of said cylinder; a longitudinally perforated bushing frictionally yet rotatably mounted at the opposite end of the cylinder, and a needle extending through said bushing slidable through said opening but non-rotatable relatively thereto so that by rotating the bushing in the cylinder, the needle will be rotated therewith relative to the finger grip.

2. In a pneumatic mending device having a cylinder and a finger grip at one end of said cylinder; a reciprocable needle extending outwardly of cylinder at the end opposite the finger grip, said needle being of substantially rectangular cross section, a bushing having a hole therein through which the needle passes, the contour of said hole corresponding to the cross section of the needle, the said bushing being frictionally yet rotatably mounted for rotatably adjusting the needle with respect to the finger grip.

3. A device in accordance with claim 1 wherein the bushing is provided with a flange by which it may be gripped for rotation.

4. A device in accordance with claim 2 wherein the bushing is provided with a flange by which it may be gripped for rotation.

5. A device in accordance with claim 1 wherein the finger grip is removably secured to the cylinder and forms a closure therefor.

MARCEL VITOUX.